United States Patent
Rovinsky

(10) Patent No.: US 10,023,116 B2
(45) Date of Patent: Jul. 17, 2018

(54) SYSTEM AND METHOD FOR DETECTING AN UNATTENDED LIVING PRESENCE IN A VEHICLE

(71) Applicant: Jacob Rovinsky, Modiin (IL)

(72) Inventor: Jacob Rovinsky, Modiin (IL)

(*) Notice: Subject to any disclaimer, the term of this patent is extended or adjusted under 35 U.S.C. 154(b) by 0 days.

(21) Appl. No.: 15/323,577

(22) PCT Filed: Jul. 2, 2015

(86) PCT No.: PCT/IL2015/050683
§ 371 (c)(1),
(2) Date: Jan. 3, 2017

(87) PCT Pub. No.: WO2016/001927
PCT Pub. Date: Jan. 7, 2016

(65) Prior Publication Data
US 2017/0144595 A1   May 25, 2017

(30) Foreign Application Priority Data
Jul. 3, 2014 (IL) .......................................... 233494

(51) Int. Cl.
*B60Q 9/00* (2006.01)
*B60N 2/00* (2006.01)

(52) U.S. Cl.
CPC ............... *B60Q 9/00* (2013.01); *B60N 2/002* (2013.01)

(58) Field of Classification Search
None
See application file for complete search history.

(56) References Cited

U.S. PATENT DOCUMENTS

| 7,170,401 | B1 | 1/2007 | Cole |
| 7,714,737 | B1 | 5/2010 | Morningstar |
| 8,063,788 | B1 | 11/2011 | Morningstar |
| 8,493,201 | B2 | 7/2013 | Orbach |
| 2012/0050021 | A1* | 3/2012 | Rao ........................ B60N 2/002 340/425.5 |

OTHER PUBLICATIONS

U.S. Child Nontraffic Fatalities dated May 29, 2016, http://i.imgur.com/1Ls2iqx.png (nontraffic fatalities 2001-2010).
(Continued)

*Primary Examiner* — Leon-Viet Nguyen
(74) *Attorney, Agent, or Firm* — Browdy and Niemark, PLLC

(57) ABSTRACT

A computer-implemented method for detecting an unattended living presence in a vehicle having at least two doors, comprising determining, before the vehicle starts moving, a first total number of vehicle door openings utilizing a non added-on door sensor integrated in the vehicle, each of the door sensors is associated with at least one of the at least two doors and is indicative of a door state, wherein each opening of a door indicates a change in a door state of a door, out of the at least two doors, from a door closed state to a door open state; determining, after the vehicle has stopped moving and until being locked, a second total number of vehicle door openings utilizing the non added-on door sensors; and in case the first total number exceeds the second total number, outputting an alert on a possible unattended living presence in a vehicle.

19 Claims, 2 Drawing Sheets

(56) References Cited

OTHER PUBLICATIONS

"Motor Vehicle Safety Fact Sheet", (2013) file://netapp/users/atnir/Desktop/S/2273430/2013_motor_vehicle_safety_fact_sheet.pdf.
Jan Null, "Heatstroke Deaths of Children in Vehicles", CCM Department of Geosciences, SFSU, Jul. 14, 2013, http://www.briansilber.com/files/2015/02/Heatstrok-Deaths-of-Children-in-Vehicles-Grow-Child-Abuse-Case.pdf.
Verizon patents car seat that alerts parent if child is forgotten in car, May 9, 2013, http://www.fiercewireless.com/story/verizon-patents-car-seat-alerts-parent-if-child-forgotten-car/2013-05-09.

* cited by examiner

SYSTEM AND METHOD FOR DETECTING AN UNATTENDED LIVING PRESENCE IN A VEHICLE

TECHNOLOGICAL FIELD

The present invention relates to a system and a method for detecting a living presence, such as an unattended child or a baby, in a vehicle.

BACKGROUND

The unfortunate scenario of leaving unattended children in vehicles, such as in a car, has had, in many cases, devastating outcomes.

Each year, children are left alone in vehicles, when the driver of the vehicle, whether being the parent of the child or a caregiver, inadvertently leaves a child and still buckled up in the safety seat, while rushing to work, to run errands, or due to an ongoing telephone conversation distracting the mind of the driver when reaching his destination and leaving the vehicle.

In case of hot environmental conditions, the heating dynamics in the vehicle cause the air trapped in the vehicle, and consequently the interior temperature of the vehicle, to rise sharply in a matter of minutes. No living body can survive such extreme temperatures, let a alone a child, whose internal temperature control is different to that of an adult, and whose temperature can rise at a rate which is three to five times faster than an adult.

A child being left unattended in such extreme conditions in a vehicle may suffer from hyperthermia (heatstroke), a medical emergency which may be fatal.

According to statistics on children's safety during a journey, the age of children that have died from heatstroke while left in cars, ranges from 5 days to 14 years, while more than a half of these children were toddlers under the age of 2 years. Young children or toddlers may be left in a car, for example, when they fall asleep during a journey, or when their mind is distracted with a certain activity or game, such that in both cases they do not make any sound during at least part of the journey, and hence do not provide any reminder of their presence.

In many countries, children under the age of eight must be seated in a car seat or a booster. By countries law, toddlers under the age of three must be seated in a car seat. Young children, let alone toddlers, cannot unbuckle their seatbelt and exit the car by themselves. Moreover, toddlers, in particular, are unaware of the critical situation which they face, and hence cannot take any steps to exit the vehicle or to attract the attention of any driver/passerby.

A child being locked and left unattended in a vehicle is, in many cases, unable to unlock and open the vehicle's door to rescue himself, and can only be saved by either the driver himself, or by a passerby. However, in certain unfortunate circumstances, the driver, sometimes being the child's parent, leaves and locks the vehicle, while inadvertently leaving the child behind, still fastened to a child safety seat. Passersby generally do not pay any attention to the interior of a vehicle, and are hence usually unaware of any child locked therein. Moreover, if the person left in the vehicle is a baby or toddler, he may be calmly sitting in his safety seat, or even be sleeping, while making no noise, and therefore does not draw the driver's (leaving the car) or passersby's attention.

Some known systems have proposed solutions for detecting children left in a vehicle.

For example, U.S. Pat. No. 7,170,401 discloses a system that detects the presence of an unattended child within a vehicle and when the child is so detected, disables the vehicle's door locks by preventing doors from being locked or remaining locked and sounds an alarm. The presence of a child is detected by measuring pressure on the back seat and measurements above a threshold limit signify a child is present or if any of the rear seat belts are buckled a child is detected. The system can be shut off by the driver, although the system has an over journey in the shutoff mode, so that if the temperature rises above or falls below a certain level and the presence of a child is detected, the alarm is sounded. In this mode, U.S. Pat. No. 7,170,401 discloses that the presence of the child can also be detected by a motion sensor.

Another solution is proposed in U.S. Pat. No. 7,714,737 disclosing a warning system for notifying another person when a child is left in a child safety seat. The system recognizes a child in a child safety seat by either a pressure pad or a secured child seat lap belt. The system is activated by the release of the driver's seat belt. Should a child remain in the seat when the driver's seat belt is disengaged, the system alarms notifying the driver of such. The alarm would include a calm audio output such as a lullaby, a song, or a story. The system can be integrated into the OEM features to provide an alert escalation process using a local alert, a vehicle alert, a wireless alert, and ultimately a 911 alert.

However, the above two examples of known systems, and other known systems, necessitate the integration of external sensors in the vehicle. U.S. Pat. No. 7,170,401 referred to above, uses motion sensors or pressure sensors for detecting a living presence in a vehicle. Similarly, U.S. Pat. No. 7,714,737 involves a pressure pad or secured child seat lap belt. Both of these components require integration of external component in a vehicle, in addition to existing components or sensors in the car.

There is therefore a need in the art to provide for a new system and a method which does not require assembly of additional sensors in the car for detecting an unattended living presence in a vehicle.

GENERAL DESCRIPTION

In accordance with an aspect of the presently disclosed subject matter, there is provided a computer-implemented method for detecting an unattended living presence in a vehicle having at least two doors, comprising:

(i) determining that the vehicle is stationary, giving rise to a pre-moving vehicle state;

(ii) providing with respect to each door of the at least two doors, a door closed status indicative that the door is closed, or a door opened status indicative that the door is opened;

(iii) updating a value of at least one first door opening indicator in response to receiving an indication that any door of the at least two doors changes the door status from the door closed status to the door opened status, in response to opening the door;

(iv) repeating stage (iii), until determining that the vehicle starts moving giving rise to a moving vehicle state; the updated value of the at least one first door opening indicator obtained in (iii) being indicative of a number of doors opened while the vehicle is in the pre-moving vehicle state; wherein the moving vehicle state is indicative that all doors of the at least two doors changed the door status from the door opened status to the door closed status, in response to closing the doors;

(v) determining that the vehicle stopped moving giving rise to a post-moving vehicle state;

(vi) updating a value of at least one second door opening indicator in response to receiving an indication that any door of the at least two doors changes the door status from the door closed status to the door opened status, in response to opening the door;

(vii) repeating stage (vi), until determining that the vehicle is locked, giving rise to a locked vehicle state; the updated value of the at least one second door opening indicator obtained in (vi) being indicative of a number of doors opened while the vehicle is in the post-moving vehicle state;

(viii) analyzing the values of the at least one first door opening indicator and at least one second door opening indicator to determine if the number of doors opened while the vehicle is in pre-moving vehicle stage exceeds the number of doors opened while the vehicle is in post-moving vehicle stage, and, if in the affirmative, outputting an alert of a possible living presence in a vehicle.

In accordance with an embodiment of the presently disclosed subject matter, there is further provided a computer-implemented method wherein at least one of the at least one first and second door opening indicators is a counter configured to count a total number of opened doors; and wherein the updated values in stages (iii) and (vi) are indicative of a total number of doors opened while the vehicle is in the pre-moving vehicle state and a total number of doors opened while the vehicle is in the post-moving vehicle state, respectively.

In accordance with an embodiment of the presently disclosed subject matter, there is yet further provided a computer-implemented method wherein at least one of the at least two doors is a door determined to be ignored constituting a disregarded door, and wherein the updating in stages (iii) and (vi) occurs in response to indications received from at least one door of the at least two doors, not constituting the disregarded door.

In accordance with an embodiment of the presently disclosed subject matter, there is further provided a computer-implemented method wherein the disregarded door is a door adjacent to a seat of a driver.

In accordance with an embodiment of the presently disclosed subject matter, there is further provided a computer-implemented method wherein the disregarded door is a baggage door.

In accordance with an embodiment of the presently disclosed subject matter, there is further provided a computer-implemented method wherein at least one of the at least one first and second door opening indicators is a flag, and wherein the numbers of door openings in stages (iii) and (vi) does not exceed 1.

In accordance with an embodiment of the presently disclosed subject matter, there is further provided a computer-implemented method wherein the at least first and second door opening indicators being a single common door opening indicator, and wherein the updating in step (vi) is reversed to the updating in step (iii).

In accordance with an embodiment of the presently disclosed subject matter, there is further provided a computer-implemented method wherein the updating in stage (iii) constitutes incrementing the value of the single common door opening indicators by a value N and wherein the reversed updating in stage (vi) constitutes decrementing the value of the single common door opening indicators by the value N.

In accordance with an embodiment of the presently disclosed subject matter, there is further provided a computer-implemented method wherein the N is different for all doors.

In accordance with an embodiment of the presently disclosed subject matter, there is further provided a computer-implemented method wherein the opening indicator is a decimal number and N is $1+1/10^n$ for the first opening of door number n and 0 for the following openings of the same door during step (iv).

In accordance with an embodiment of the presently disclosed subject matter, there is further provided a computer-implemented method wherein the opening indicator as a positional number with a base of M and N is $1+1/M^n$ for the first opening of door number n and 0 for the following openings of the same door during steps (iii) and (iv).

In accordance with an embodiment of the presently disclosed subject matter, there is yet further provided a computer-implemented method wherein N is identical for all repeated steps (iii) and (vi).

In accordance with an embodiment of the presently disclosed subject matter, there is yet further provided a computer-implemented method wherein the vehicle comprises at least two non added-on door sensors, each of the non added-on door sensors is associated with a respective door of the at least two doors, and wherein each of the non added-on door sensors is configured to provide an indication that any door of the at least two doors changes the door status from the door closed status to the door opened status, in response to opening the door.

In accordance with an embodiment of the presently disclosed subject matter, there is yet further provided a computer-implemented method wherein the receiving indication in stages (iii), and (vi) is based on at least one indication provided by at least one non added-on door sensor.

In accordance with an embodiment of the presently disclosed subject matter, there is yet further provided a computer-implemented method wherein at least one of the determining in stages (i), (iv) and (v) and (vii) is based on at least one indication provided by at least one non added-on indicator integrated in the vehicle.

In accordance with an embodiment of the presently disclosed subject matter, there is yet further provided a computer-implemented method wherein the at least one non added-on indicator is selected from a group comprising: an automotive sensors system, transmission sensor, an operating switch, a driver's seat pressure sensor, an alarm system, a vehicle locking sensor and a door sensor.

In accordance with an embodiment of the presently disclosed subject matter, there is yet further provided a computer-implemented method wherein the indicator is an automotive sensors system, and wherein the determining in stages (i) and (v) is based on receiving an indication from the automotive sensors system that a motor of the vehicle is off; and the determining in stage (iv) is based on receiving an indication from the automotive sensors system that the motor is turned on.

In accordance with an embodiment of the presently disclosed subject matter, there is yet further provided a computer-implemented method wherein updating in stage (iii) further comprises: in response to receiving an indication that any door of the at least two doors changes the door status from the door closed status to the door opened status, sampling a timer and receiving a measured duration representative of a time interval during which the door was opened, and updating a value of at least first counter, only if the measured duration exceeds a predetermined threshold.

In accordance with an embodiment of the presently disclosed subject matter, there is yet further provided a computer-implemented method wherein updating in stage (vi) further comprises: in response to receiving an indication that any door of said at least two doors changes the door status from the door closed status to the door opened status, sampling a timer and receiving a measured duration representative of a time interval during which the door was opened, and updating a value of at least second counter, only if the measured duration exceeds a predetermined threshold.

In accordance with an embodiment of the presently disclosed subject matter, there is yet further provided a computer-implemented method wherein the vehicle comprises one or more of an alarm system, a hazard system and emergency system, and wherein the outputting an alert in stage (viii) comprises triggering at least one of the alarm system, hazard system and emergency system, wherein the one or more triggered systems are configured to output at least one type of alert.

In accordance with an embodiment of the presently disclosed subject matter, there is yet further provided a computer-implemented method further comprising deactivating the one or more triggered systems.

In accordance with an aspect of the presently disclosed subject matter, there is yet further provided a computerized device for detecting an unattended living presence in a vehicle having at least two doors, the device comprising computer memory operatively coupled to at least one controller; the at least one controller being configured to: determine that the vehicle is stationary, giving rise to a pre-moving vehicle state; provide with respect to each door of the at least two doors a door closed status indicative that the door is closed or a door opened status indicative that the door is opened; update a value of at least one first door opening indicator in response to receiving an indication that any door of the at least two doors changes the door status from the door closed status to the door opened status, in response to opening the door; repeat the stage of updating a value, until determining that the vehicle starts moving giving rise to a moving vehicle state; the updated value of the at least one first door opening indicator obtained being indicative of a number of doors opened while the vehicle is in the pre-moving vehicle state; wherein the moving vehicle state is indicative that all doors of the at least two doors changed the door status from the door opened status to the door closed status, in response to closing the doors; determine that the vehicle has stopped moving, giving rise to a post-moving vehicle state; update a value of at least one second door opening indicator in response to receiving an indication that any door of the at least two doors changes the door status from the door closed status to the door opened status, in response to opening the door; repeat the stage of updating a value of at least one second door opening indicator, until determining that the vehicle is locked giving rise to a locked vehicle state; the updated value of the at least one second door opening indicator obtained is indicative of a number of doors opened while the vehicle is in the post-moving vehicle state; analyze the values of the at least one first door opening indicator and at least one second door opening indicator to determine if the number of doors opened while the vehicle is in pre-moving vehicle stage exceeds the number of doors opened while the vehicle is in post-moving vehicle stage, and, if in the affirmative, outputting an alert of a possible living presence in a vehicle.

In accordance with an aspect of the presently disclosed subject matter, there is yet further provided a system of detecting an attended living presence in a vehicle, the vehicle having at least two doors, the system comprising: a motor sensor coupled to a motor for indicating whether the motor is switched on or off; a transmission sensor coupled to a transmission for indicating whether the transmission is in one of the following states: a drive state, a reverse state, a parking state or a neutral state; at least two door sensors, each of the at least two door sensors coupled to a respective door of the at least two doors and is configured to provide with respect to each door of the at least two doors a door closed status indicative that the door is closed or a door opened status indicative that the door is opened; an alert system configured to output a alert in response to triggering the alert system; and a controller operatively coupled to the at least two door sensors, to the motor sensor, to a transmission sensor and to the alarm system, the controller comprising at least one door opening indicator; wherein the controller is configured to: determine that the motor is off, giving rise to a pre-moving vehicle stage; update a value of at least one first door opening indicator in response to receiving an indication from any door sensor of the door sensors that a corresponding door of the at least two doors changes the door status from the door closed status to the door opened status, in response to opening the door; repeat the stage of update a value of at least one first door opening indicator, until determining that the motor is turned on and the transmission has turned to a drive state; the updated value of the at least one first door opening indicator obtained being indicative of a number of doors opened while the vehicle is in the pre-moving vehicle state; wherein the moving vehicle state is indicative that all doors of the at least two doors changed the door status from the door opened status to the door closed status, in response to closing the doors; determine that the motor was turned off giving rise to a post-moving vehicle stage; update a value of at least one second door opening indicator in response to receiving an indication that any door of the at least two doors changes the door status from the door closed status to the door opened status, in response to opening the door; repeat the stage of update a value of at least one second door opening indicator, until determining that the vehicle is locked giving rise to a locked vehicle state; the updated value of the at least one second door opening indicator obtained being indicative of a number of doors opened while the vehicle is in the post-moving vehicle state; analyze the values of the at least one first door opening indicator and at least one second door opening indicator to determine if the number of doors opened while the vehicle is in pre-moving vehicle stage exceeds the number of doors opened while the vehicle is in post-moving vehicle stage, and, if in the affirmative, outputting an alert of a possible unattended living presence in a vehicle.

In accordance with an embodiment of the presently disclosed subject matter, there is yet further provided a system wherein the alert system is comprised of at least one of alarm system, hazard system and emergency system, and wherein outputting an alert comprises outputting at least one type of alert.

In accordance with an aspect of the presently disclosed subject matter, there is yet further provided a computer-implemented method for detecting an unattended living presence in a vehicle having at least two doors, comprising determining, before the vehicle starts moving, a first total number of vehicle door openings utilizing a non added-on door sensor integrated in the vehicle, each of the door sensors is associated with at least one of the at least two doors and is indicative of a door state, wherein each opening of a door indicates a change in a door state of a door, out of the at least two doors, from a door closed state to a door open state; determining, after the vehicle has stopped moving and until being locked, a second total number of vehicle door openings utilizing the non added-on door sensors; and in case the first total number exceeds the second total number, outputting an alert on a possible unattended living presence in a vehicle, wherein any of stages of determining utilizes non added-on components integrated in the vehicle.

In accordance with an embodiment of the presently disclosed subject matter, there is yet further provided a computer-implemented method wherein the first total number and the second total number refer to one door of the at least two doors.

In accordance with an embodiment of the presently disclosed subject matter, there is yet further provided a computer-implemented method wherein the first total number and the second total number refer to number of doors opened before vehicle starts moving and after vehicle stops moving.

In accordance with an aspect of the presently disclosed subject matter, there is yet further provided a computer-implemented program storage device readable by machine, tangibly embodying a program of instructions executable by the machine to perform a method for detecting an unattended living presence in a vehicle having at least two doors, comprising: determining that the vehicle is stationary, giving rise to a pre-moving vehicle state; providing with respect to each door of the at least two doors, a door closed status indicative that the door is closed or a door opened status indicative that the door is opened; updating a value of at least one first door opened indicator in response to receiving an indication that any door of the at least two doors changes the door status from the door closed status to the door opened status, in response to opening the door; repeating said the stage of updating until determining that the vehicle starts moving giving rise to a moving vehicle state; the updated value of the at least one first door opening indicator obtained is indicative of a number of doors opened while the vehicle is in the pre-moving vehicle state; wherein the moving vehicle state is indicative that all doors of the at least two doors changed the door status from the door opened status to the door closed status, in response to closing the doors; determining that the vehicle stopped moving, giving rise to a post-moving vehicle state; updating a value of at least one opening of a second door indicator in response to receiving an indication that any door of the at least two doors changes the door status from the door closed status to the door opened status, in response to opening the door; repeating the stage of updating a value of at least one opening of a second door, until determining that the vehicle is locked, giving rise to a locked vehicle state; the updated value of the at least one second door opening indicator obtained being indicative of a number of doors opened while the vehicle is in the post-moving vehicle state; analyzing the values of the at least one first door opening indicator and at least one second door opening indicator to determine if the number of doors opened while the vehicle is in pre-moving vehicle stage exceeds the number of doors opened while the vehicle is in post-moving vehicle stage, and, if in the affirmative, outputting an alert of a possible unattended living presence in a vehicle.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Unless specifically stated otherwise, as apparent from the following discussions, it is appreciated that throughout the specification discussions utilizing terms such as determining, providing, updating, receiving, repeating, analyzing, outputting, incrementing, decrementing, sampling, triggering, deactivating or the like, include action and/or processes of a computer that manipulate and/or transform data into other data, said data represented as physical quantities, e.g. such as electronic quantities, and/or said data representing the physical objects.

The terms "computer", "computerized device", "machine" or variation thereof should be expansively construed to cover any type of electronic device comprising or otherwise operatively connected to a computer memory and having data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and/or any combination thereof.

As used herein, the phrases "for example, "such as", "an example" and variants thereof describe non-limiting embodiments of the presently disclosed subject matter. Reference in the specification to "some cases", "other cases" or variants thereof means that a particular feature, structure or characteristic described in connection with the embodiment(s) is included in at least one embodiment of the presently disclosed subject matter. Thus the appearance of the phrase "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided in separate embodiments or in any suitable combination or sub-combination of embodiments.

Figure 1:
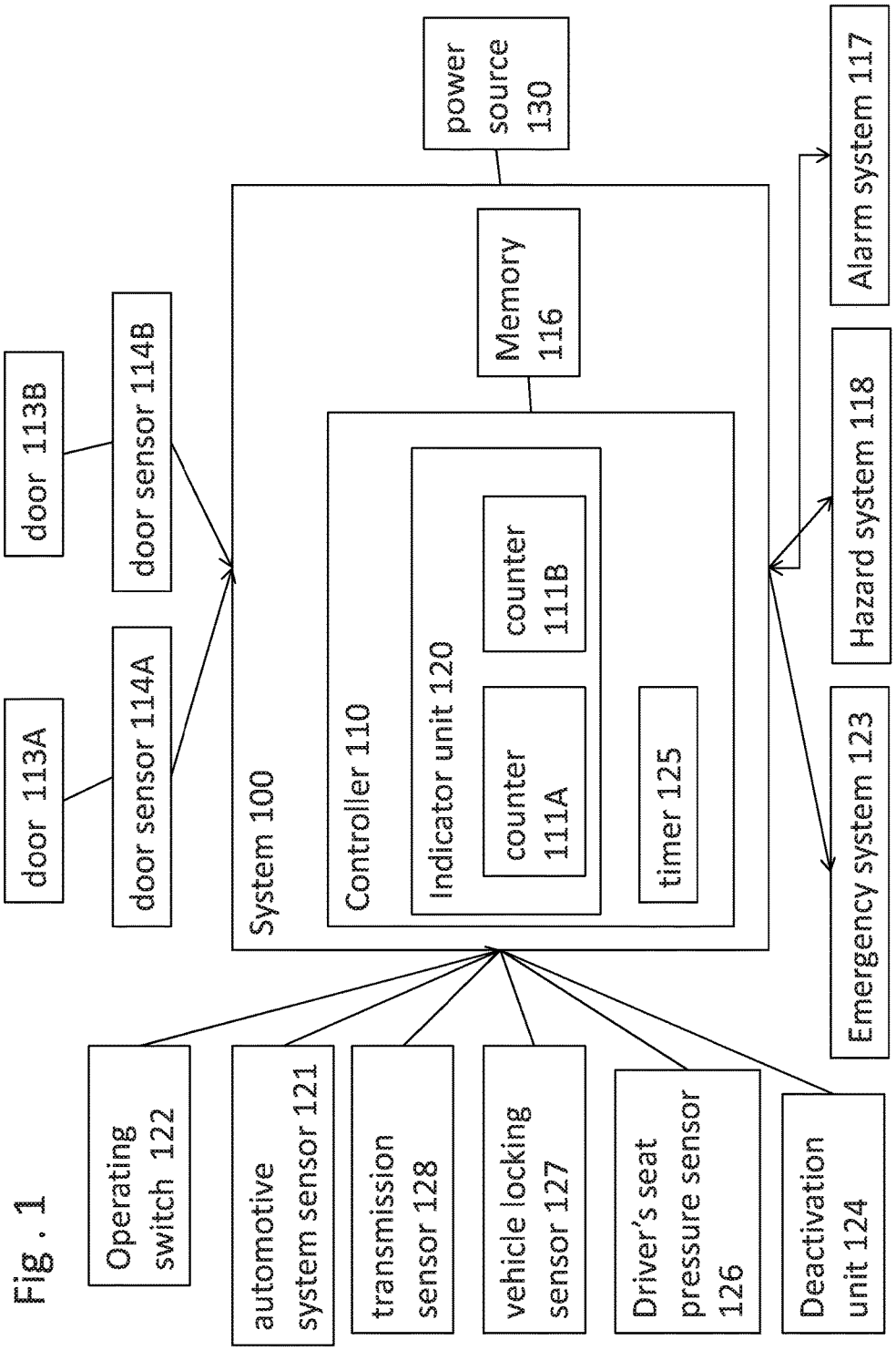
FIG. 1 is a functional block diagram schematically illustrating system for detecting an unattended living presence in a vehicle, in accordance with certain embodiments of the invention.
Figure 2:
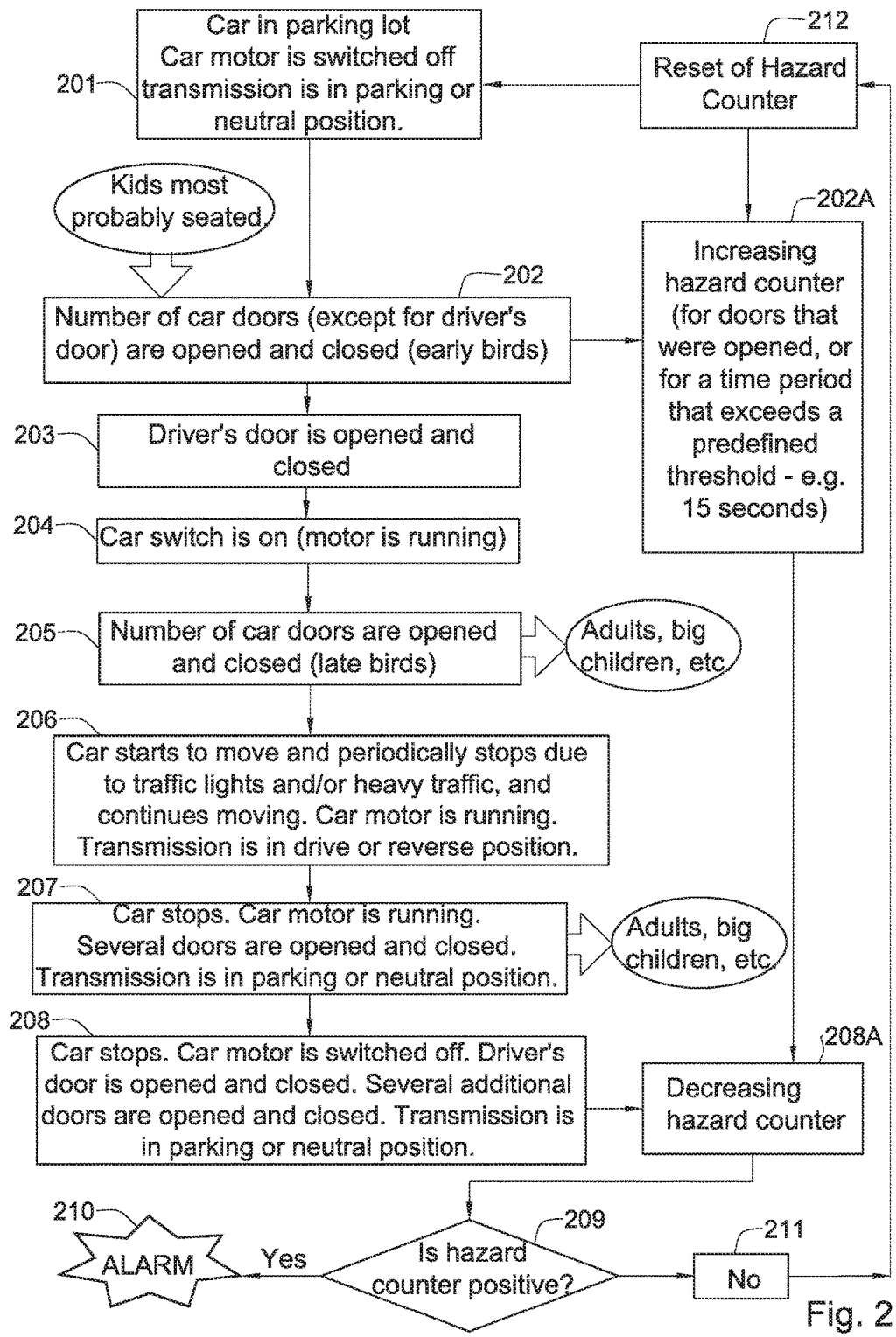
FIG. 2 is a flow diagram showing an example of a sequence of operations performed during the detection process, in accordance with the presently disclosed subject matter.

In embodiments of the presently disclosed subject matter, fewer, more and/or different stages than those shown in FIG. 2, may be executed. In embodiments of the presently disclosed subject matter one or more stages illustrated in FIG. 2 may be executed in a different order and/or one or more groups of stages may be executed simultaneously. FIG. 1 illustrates a general schematic of a system for detecting an unattended living presence in a vehicle in accordance with an embodiment of the presently disclosed subject matter. Functional elements in FIG. 1 can be made up of a combination of software and hardware and/or firmware that performs the functions as defined and explained herein. Functional elements in FIG. 1 can comprise at least one respective computer processor and/or computer memory or can be a part of a computer processor or of a computer memory, the computer processor and the memory being configured for executing instructions for performing the respective functions. The system shown in FIG. 1 or various components thereof depicted in FIG. 1 may comprise fewer, more, and/or different modules or elements than those shown in the figures.

The invention may be described in the general context of computer code or machine-useable instructions, including computer-executable instructions such as program modules, being executed by a computer or other machines, such as other handheld devices. Generally, program modules including routines, programs, objects, components, data structures, and the like refer to codes that perform particular tasks or implement particular abstract data types. Embodiments described herein may be practiced in a variety of system configurations, including hand-held devices, consumer electronics, general-purpose computers, and other specialty computing devices, etc. Embodiments described herein may also be practiced in distributed computing environments where tasks are performed by remote-processing devices that are linked through a communications network.

In accordance with certain embodiments, the system and method of the invention copes with well known characteristics of the car industry, being overly conservative and reluctant to modify or integrate additional elements to the chassis of the vehicle. This stems from the fact that any integration of additional sensors in a car increases the car's basic price, resulting in a higher price for the end buyer, a fact which reduces motivation of car manufacturers to integrate safety systems of known type into new vehicles.

Hence, in accordance with certain embodiments of the invention there is provided a system and a method for detecting an unattended living presence in a vehicle, which does not require assembly of additional sensors in the car.

Bearing all this in mind, and before describing various embodiments with reference to the drawings, it should be noted that most vehicles used for transporting children have at least two doors. One of the doors is placed next to the driver's seat, such that the driver can easily get in/out of the car. Another door is used by the driver, or another adult, to put a child into the car. Hence, in order to get the child into a car, the driver opens one of the doors of the car, which is different to the door later used by the driver to get into the car. The driver then closes the opened door, and opens a second door, placed next to the driver's seat, to get into the car.

Putting children into a car is dependent on the age of the specific child. Putting a young child into a car can be done by opening the door for him while he enters the car by himself. On the other hand, putting in a toddler involves the insertion of a toddler's car seat into the car, while the toddler is already bucked in the car seat. The toddler's car seat itself can then be buckled up with a car belt in order to be tied into the car. In an alternative manner, the toddler's car seat can be locked onto a fixed car seat base, fitted to the toddler's car seat, where the car seat base is already buckled up in the car.

Once the child, or the toddler, is in the car, the driver gets into the car (through the door adjacent to the driver's seat) and starts the journey, until reaching the desired destination. When reaching the destination, the driver gets out of the car, by opening the door next to the driver's seat, and opens a second door, which is closed to the child or toddler's seat, in order to get the child or toddler out, either by letting the child get out of the car, or by taking out the toddler, with or without the car seat.

In some cases, a car seat (or a booster) for a child (whether with the support of a seat base for toddlers or not), is placed (buckled) in the seat next to a door, in order to ease the driver's access to the child buckled in the seat. Hence, if two young children are being transported in the vehicle, their seats are placed next to two doors of the vehicle (in addition to the driver's door), such that in order to get a child into the car, one door will have to be opened for each of the children. Therefore, in cases where a driver wishes to get two children into the car, the driver opens a first door in order to get the first child into the car, and a second door in order to get in the second child into the car. A third door, adjacent to the driver's seat, will then be used by the driver himself to get into the car. The same three doors will be opened at the end of the journey in order to get out of the car, and to get also the children out of the car.

In accordance with certain embodiments, counting the number of doors opened prior to the journey can therefore be indicative of the number of passengers (the driver, other adults and children) getting into the car. Counting the number of doors opened at the end of the journey, can, for the same reason, be indicative of the number of passengers getting out of the car.

The correlation between the number of doors opened prior to and after the journey can be used to detect a possible living presence in a vehicle. Hence, after counting the doors opened before and after the journey, the number of doors opened at the end of journey can be compared to the number of doors opened prior to the journey. If the number of doors opened prior to the journey exceeds the number of doors opened after reaching the destination at end of journey, it is determined at least one door was not opened, and hence that there is a likelihood that a living presence, e.g. a child or a toddler, has been left in the car.

Since the driver's door is used by the driver (an adult) to get in and out of the car, in certain embodiments, counting of opened doors can not take into account the door next to the driver, adjacent to which a child is not likely to be seated. A door which is to be ignored, such as the driver's door, is also to be referred herein as a disregarded door. Any other door, which is potentially adjacent to a child seat and should be counted, is to be referred herein as a considered door.

Another example of a disregarded door is the baggage door, for the simple reason that a child is not likely to be seated in the baggage compartment. Hence, according to certain embodiments, the number of doors opened prior to and after the journey, refers only to the considered doors and does not include the disregarded doors.

Similar indication of the number of passengers joining the ride and which should get in and out, before and after the journey, can be obtained from the mere indication that at least one door, a part of a disregarded door, such as the driver's door, was opened prior to the journey. Opening at least one considered door means that there is a probability that a passenger who is not the driver has entered or was put in the car. Correspondingly, at the end of the journey, at least one door, apart from the driver's door, should also be opened in order for the passenger to get out.

In certain embodiments, the indication can be received with respect to a certain considered door which was opened prior to the journey and should also be opened at the end of the journey. Alternatively or additionally, the indication can be received with respect to any considered door which was opened prior to the journey, and any different or identical considered door which was opened after the journey.

Therefore, in accordance with certain embodiments, counting the number of doors opened prior to (and after) the journey can therefore be regarded as "counting" at least one considered door, which is not a disregarded door, which was opened prior to (and after) the journey.

In certain embodiments, counting the number of opened doors can relate to disguised doors only, i.e., each opened door is counted only once, while assuming that once a certain door was opened, it is not likely to be opened twice in the same period of time (prior to or after the journey) to insert another child into the vehicle.

The number of doors opened prior to and after the journey, can then be analyzed. The analysis in this case means determining whether the number of doors opened prior to the journey exceeds the number of doors opened after the journey, in other words, whether any considered door was opened prior to the journey, but no door was opened after the journey.

If the number of doors opened before the journey exceeds the number of doors opened after the journey, the system outputs an alert in order to get the attention of the driver or passerby nearby the car, to the unattended child being left in the car.

It should be noted that although the description herein mainly refers to children or toddlers, the invention is related to subjects getting into a car, and a living presence being left in the car. Hence those skilled in the art would readily appreciate that the subject referred to herein, as well as a living presence, also includes non-human animals, such as dogs or cats being transported, and later being left in the car.

It should also be noted that there are some possible scenarios in which the system will not output an alert, although a living presence may be left in the vehicle.

One possible scenario may be when a driver opens a door prior to a journey, to put a child into a car, and opens a second door for getting himself into the car, while holding a bag to be placed in a seat next to the driver, or even next to the child. At the end of the journey, however, the driver gets out of the car, and opens the second door to get the bag out of the car, while leaving the child seated in his car seat. Since the system detects two doors which have been opened, one for the driver and a second one for the bag, which may even be the same two doors opened prior to the journey, the system will not output an alert. Such a situation seems to be unlikely, but possible, with low probability (the driver will most likely pay attention to the child while getting out his bag).

An exemplary scenario, resulting in outputting a false alert of a possible living presence in a vehicle, i.e. activation of the system where, in fact, no living presence is left in the vehicle, may occur when a toddler's safety seat is placed in a seat adjacent to the driver. In this example, two doors are opened prior to the journey. The first door allows the driver to get a child into the car, and the second is used by the driver himself to get into the car. When reaching the destination, the driver decides to pull out the child from the car seat while the driver is still sitting in his driving seat, and to get out from the same door, the one which is adjacent to the driver's seat. In this scenario, the system detects that two doors were opened prior to the journey, but only one was opened at the end of the journey, and will output an alert, in this case, a false alert.

Thus, in accordance with certain embodiments, a living presence may be detected with a high degree of probability without usage or integration of external means to those currently fitted in vehicles (non added-on components such as door sensors, automotive sensors system, and other components which are described further below). This constitutes an advantage from the standpoint of car manufacturers who are reluctant to fit add-on components and therefore may prefer to utilize a solution of the kind disclosed herein in accordance with various embodiments Bearing all this in mind, attention is drawn to FIG. 1 illustrating a functional block diagram of a schematic system 100 for detecting an unattended living presence in a vehicle, in accordance with certain embodiments of the invention.

In one exemplary configuration, system 100 is a computerized device located in a vehicle, such as a car, and includes at least memory 116 and a controller 110. System 100 can form an integral part of the currently existing car's main controller (not shown) (e.g. electronic control unit (ECU) or car's computer). The main controller is typically in charge of controlling one or more of the electrical systems or subsystems in a motor vehicle, such as electronic/engine control module, powertrain control module, transmission control module, brake control module, central control module and such. Alternatively, system 100 can be operatively coupled to the car's main controller.

Irrespective of the connection between system 100 and the car's main controller, according to certain embodiments, system 100 is configured to receive from the main controller some or all of the indications or inputs which are received at the main controller and/or to communicate with other non-added on components integrated in the car, which currently communicate with the main controller. Some examples of such other non added-on components are automotive sensors system 121, driver's seat pressure sensor 126, transmission sensor 128, vehicle locking sensor 127, door sensors 114A and 114B and additional components illustrated in FIG. 1 which are further described below.

Controller 110 included in system 100 may be a processing unit, operatively coupled to at least one memory 116. Controller 110 comprises an indicator unit 120. Indicator unit 120 comprises a first and a second opened doors indicator (not shown), each having an editable initial value.

According to certain embodiments, controller 110 is configured to count a first total number of doors opened prior to the journey, when the vehicle is stationary and is considered to be in a pre-moving vehicle state. Counting continues until determining that the vehicle starts moving, giving rise to a moving vehicle state. Transition of the vehicle from the pre-moving to moving state can be based e.g. on information provided by transmission sensor 128 (e.g. change of vehicle transmission state from a parking to a driving state). The moving vehicle state is indicative that all doors of the vehicle are closed.

Controller 110 is further configured to count a second total number of doors opened after reaching the destination, i.e., after the vehicle stopped moving, also to be referred to as a post-moving vehicle state. Transition of the vehicle from the moving to the post-moving state also can e.g. be based on information provided by automotive transmission sensor 128 (e.g. change of vehicle transmission state from a driving to a parking state etc.). Counting the doors at a post-moving vehicle state continues until the vehicle is locked (e.g. according to indication provided by vehicle locking sensor 127), while entering a locked vehicle state.

Controller 110 is then configured to analyze the number of opened doors prior to the journey (first total number of doors) and after the journey (second total number of doors) to determine whether the number of doors opened prior to the journey exceeds the number of doors opened after the journey. If the number of doors opened prior to the journey indeed exceeds those subsequently opened, then at least one door, possibly placed next to a child, was not opened at the end of the journey. This may indicate a child that was possibly left unattended in the vehicle. Controller 110 is then configured to output an alert of a possible living presence in a vehicle.

Each of the vehicle's doors is either in a door closed status, indicative that the door is closed, or in a door opened status, indicative that said door has been opened. Determining opening of a door is in response to receiving an indication that a door changes its door status from a door closed status to a door opened status. Similarly, determining closing of a door is in response to receiving an indication that a door changes its door status from a door opened status to a door closed status. Door closed status and door opened status can be determined with the assistance of door sensors 114A and 114B which are discussed below.

According to certain embodiments, the value of the first door opening indicator is indicative of a number of doors opened while the vehicle is in pre-moving vehicle state. Correspondingly, the value of the second door opening indicator is indicative of the number of doors opened while the vehicle is in post-moving vehicle state. Once both values of first and second door opening indicators have been updated, controller 110 is configured to analyze the values of first and second door opening indicator to determine whether the number of doors opened prior to the journey exceeds the number of doors opened after the journey. If the number of doors opened prior to the journey indeed exceeds the number of opened doors after the journey, then it is determined that at least one door was not opened.

In order to receive an indication of number of the doors opened prior to and after the journey, according to certain embodiments, one or more of first and second opened door indicators constitute one or more counters, exemplified in FIG. 1 as counter 111A and counter 111B. Counting the number of doors opened, either during a pre-moving vehicle state or during a post-moving vehicle state can be executed by updating values of at least one counter in response to receiving an indication that any door of the at least two doors of the vehicle changes the door status from a door closed status to a door opened status, in response to opening the door. The updating of the values of the at least one counter can be repeated until determining that the vehicle starts moving (if counting is executed in pre-moving vehicle state) or until determining that the vehicle being locked (if counting is executed in post-moving vehicle state).

Hence, according to certain embodiments, in order to count the number of doors opened in a pre-moving vehicle state, in response to opening a door and receiving a respective indication that that the door changes its status from a door closed status to a door opened status, controller 110 is configured to update values of at least the first counter, e.g. counter 111A, having say an initial "0" value.

In certain embodiments, the value of a counter is configured to be updated only once by openings of the same door either prior to or after the journey. Counting is for distinguishable opened doors only. In such cases, any progressive indication received from a certain door, which has already been counted, is ignored. For example, the counter can be configured as a decimal number increases by $1+1/10^n$ (where "n" is a number of a predefined specific door) responsive to the first opening of each door.

The integer value of the counter is indicative of the total number of doors opened prior to the journey. The first digital character after the decimal point is indicative of an opening status of the first door, and the second character after the decimal point is indicative of an opening status of the second door, etc.

The value of each character after the decimal point could be either "zero" or "one". For example, if a counter number is 2.101, the total number of opened doors prior to the journey is 2. Moreover the counter number is indicative that the first and the third doors were opened during the pre-moving state.

The updating of the values of the at least one counter can be repeated responsive to openings of different and/or similar doors of a vehicle until determining that the vehicle starts moving.

In certain embodiments, in cases where the counter value is indicative that the same door of a vehicle was opened a second or more times, the counter value would not be changed (the opening will be ignored). For example, if the counter number during the pre-moving state reaches the value 2.11 and a new indication of the door opening is received from the door sensors 114A or 114B, controller 110 will evaluate the input.

The counter value 2.11 means that total number of doors opened during the pre-moving state was 2 and, more specifically, that the first and second doors were opened. If the current indication of door opening related to, for example, a third door, the counter value will be updated to 3.111. Instead of this, in cases where a first or second door was opened an additional time, the value of the counter will remain b 2.11.

In more general case, the counter can be configured as a positional number with base M (for example M=2 for binary numbers or 16 for hexadecimal numbers). At this case the counter increases by $1+1/M^n$ (where "n" is a number of a predefined specific door) responsive to the first opening of each door Similar to described above, the integer value of the counter is indicative of the total number of doors opened prior or after the journey. The first digital character after the decimal point is indicative of an opening status of the first door, and the second character after the decimal point is indicative of an opening status of the second door, etc.

Controller 110 is further configured to continue updating values of counter 111A in response to any additional door being opened, in response to receiving an indication that a certain door changes its status from a door closed status to a door opened status. Each of the specified indications is representative of the fact that any door has been opened. In certain embodiments where only distinguishable opened doors are counted, controller 110 is configured to ignore any progressive indication (second and onwards) received that a certain door was opened, if a first indication was already received with respect to that specific door.

Controller 110 is configured to repeat the updating of counter 111A, until determining that the vehicle starts moving, giving rise to a moving vehicle state. The updated values of counter 111A at this state is indicative of the number of doors opened while the vehicle is in pre-moving vehicle state. In certain embodiments, the counter value is indicative of detailed information regarding each specific door of the vehicle that was opened during the pre-moving state. The moving vehicle state is indicative that all doors of the at least two doors of the vehicle changed the door status from the door opened status to the door closed status, in response to closing the doors, or in other words that the vehicle is moving when all the doors are closed.

Once reaching the destination, controller 110 is configured to determine that the vehicle stopped moving, giving rise to a post-moving vehicle state. In order to count doors opened in a post-moving vehicle state, in response to opening a door and receiving a respective indication that that the door changes its status from a door closed status to a door opened status, controller 110 is configured to update values of at least the second counter, e.g. counter 111B (also initialized, say to a value "0"), in a similar fashion to that described with respect to counter 111A above, e.g. applying the same mathematical operation, such as incrementing the value in response to opening a door. Controller 110 is further configured to continue updating the value of counter 111B in response to any additional door being opened, and in response to receiving an indication that a certain door changes its status from a door closed status to a door opened status.

Controller 110 is configured to repeat the updating of counter 111B, until determining that the locked vehicle gives rise to a locked vehicle state. The updated values of counter 111B in this state is indicative of the number of doors opened while the vehicle is in post-moving vehicle state.

According to certain embodiments, the values of counters 111A and 111B are stored in memory 116.

Once both values of counters 111A and 111B are updated, controller 110 is configured to analyze the values of counters 111A and 111B to determine whether the number of doors opened while the vehicle is in pre-moving vehicle state exceeds the number of doors opened while the vehicle is in post-moving vehicle state. According to certain embodiments, analysis of the values includes comparing the value of counter 111A and the value of counter 111B. For example in case of described above positional counter (e.g. decimal), the determination is based on whether the integer value of counter 111A exceeds the integer value of counter 111B, e.g. the integer value of 111A is higher than the integer value of 111B. If in the affirmative, i.e., the number of doors opened while the vehicle in pre-moving vehicle state indeed exceeds the number of doors opened in post-moving vehicle state, controller 110 is configured to output an alert of a possible living presence in a vehicle.

In certain embodiments, updating counter 111A in pre-moving vehicle state includes incrementing its value by a predefined value, e.g. 1 (or a different value), in response to each door being opened. Respectively, updating counter 111B in post-moving vehicle state includes incrementing its value by the same predefined value, in response to each door being opened. The values of counters 111A and 111B are then analyzed and compared to determine whether the value of 111A exceeds, e.g. higher than, the value of 111B.

In accordance with certain embodiments, counter 111A can be updated in a predefined value which is different in each door being opened. For example, counter 111A can be updated after the first door being opened in value N, and after the next door being opened in value M, which is identical, different, or a function of the value N. Counter 111B is, correspondingly, updated.

In accordance with certain embodiments, indicator unit 120 may constitute fewer or additional counters, all in a manner which enables to count the number of door openings in a pre-moving vehicle state and post-moving vehicle state, and to analyze the numbers of doors opened, in order to determine whether the number of doors opened while the vehicle is in pre-moving vehicle state exceeds the number of doors opened while the vehicle is in post-moving vehicle state.

For example, according to certain embodiments, counters 111A and 111B can form a single common counter, e.g. counter 111A only. The common counter may be initialized, e.g. by a value '0', and is subjected to a mathematical operation (say increment by a given value, for example noted above value "1+1/10"") every time a door is opened in the pre-moving state and being applied with a reverse operation (e.g. decrement by the given value), every time a door is opened in the post-moving state. In these examples, in a pre-moving vehicle state, the value of single counter 111A is, say, incremented, whereas in a post-moving vehicle state, a reverse operation is applied namely, by this example, the value of single counter 111A is decremented. Other operations and their reverse operation can be performed, e.g. multiple-divide, etc. In these examples, analyzing the value of the single counter 111A means determining whether the value of counter 111A is different compared with its initial value. If in the affirmative, then it means that at least one door was opened prior to the journey, and was not opened after the journey.

In certain embodiments where the value of the counter is also indicative of the identity of the doors opened, then in case putting a child into the car by opening a certain door and taking him out via a different door, causes a difference in the values of counters 111A and 111B, or non-zero value of a described single counter. For example, if prior to the journey first and second doors were opened, and the single counter earned value of 2.11, but after the destination first and third doors were opened, the remain value of a counter after locking the car will be 2.11−2.101=0.099. In the opposite case, where first and third doors were open during the pre-moving state instead of first and second during the post moving state, the remain value of a single counter will be 2.101−2.11=−0.091. In any case, where the same number of doors were opened at both pre- and post-moving states, the absolute value of a single counter will be limited by a fraction of integer value of counter (the absolute value of a difference is less than 0.2). Hence, according to certain embodiments, analysis of the values of one or more counters 111A and 111B includes determining whether the absolute value of a difference exceeds a certain value.

In accordance with certain embodiments, a counter may be provided for each of the doors, and can be updated, e.g. incremented, in a pre-moving vehicle state and later be re-updated in a reverse operation, e.g. decremented, in a post-moving vehicle state. The later analysis of the values of counters includes a determination whether any of the counters has a value which is not its initial value, and/or a determination whether any of the counters has a value which exceeds the value of the other counters.

It should be appreciated that the above updating of values are mere examples and should not be considered as limiting. Those skilled in the art would readily appreciate that various alternatives may be utilized with respect to the number of counters, their values and/or the updating operations of their values, all in a manner which provides an indication and enables to determine, based on the updated values, whether the number of doors opened while the vehicle is in pre-moving vehicle state exceeds the number of doors opened while the vehicle is in post-moving vehicle state.

As described above, similar indication of the number of passengers joining the ride and who should get in and out, before and after the journey, can be obtained from the mere indication that at least one considered door, i.e. at least one non disregarded door such as the driver's door, was opened prior to the journey. Correspondingly, at the end of the journey, at least one considered door should also be opened.

Hence, in certain embodiments, at least one of the at least one first and second door opening indicators constitute one or more flags (not shown), having an editable initial value, and having two possible values (e.g. a Boolean flag). One of the values of the flag, e.g. "true", is indicative that at least one considered door, e.g. not the driver's door, was opened, whereas the other value, e.g. "false", represents the initial value of the flag. The initial value of the flag can indicate either or both that no considered door, was opened, or that at least one considered door was opened prior the journey, and at least one considered door was opened after the journey.

Following is one example of operation of system 100 with a single flag. Thus, when the vehicle is stationary, controller 110 updates the value of the flag, e.g. changes its value into "true", in response to receiving an indication that at least one considered door, i.e., not being the driver's door, changes the door status from the door closed status to the door opened status, in response to opening the door.

Controller 110 is configured to repeat the updating until determining that the vehicle starts moving. Updating means maintaining the value of the single flag as "true", in response to receiving an indication that a door, whether being considered or disregarded, was opened.

The updated value of the flag in a moving vehicle state is indicative of a number of door openings while the vehicle is in said pre-moving vehicle state, where the number of door opening does not exceed 1. Meaning, the value of the flag is indicative of whether at least one considered door was opened in a pre-moving state. If indeed at least one considered door was opened, the value of flag should be "true".

After the vehicle stopped moving, giving rise to a post-moving vehicle state, controller 110 is configured to update the value of the flag, e.g. to change its value into "false", in response to receiving an indication that at least one considered door, not being a disregarded door, changes the door status from the door closed status to the door opened status, in response to opening the door.

Controller 110 is configured to repeat the updating until determining that the vehicle being locked, giving rise to a locked vehicle state. Updating means maintaining the value of the single flag as "false", in response to receiving an indication that door, whether being considered or disregarded, was opened.

The updated value of the flag in a locked vehicle state is indicative of a number of door openings while the vehicle is in post-moving vehicle state, where the number of door opening does not exceed 1. Meaning, the value of the flag is indicative of whether at least one considered door was opened in a post-moving state. If indeed at least one considered door was opened, the value of flag should be "false".

Controller 110 is then configured to analyze the value of the flag. Analysis in this case means confirming whether the value of the flag is different than "false" (i.e. "true"). If the value is "true", then at least one considered door was opened prior the journey, but no considered door was opened after the journey. If the value is different than "false", then controller 110 is configured to output an alert of a possible living presence in a vehicle.

It should be appreciated that the above example of a single flag is a mere example and should not be considered as limiting. Those skilled in the art would readily appreciate that various alteration may be utilized in respect of the number of flags and their updating methods.

In certain embodiments, indicator unit 120 may be constituted by a flag for each of the doors and/or the considered doors. Updating in pre-moving vehicle state includes updating the value of the flag associated with a specific door in response to receiving an indication that the specific door changes its status from a door closed status to a door opened status, in response to opening the specific door. Correspondingly, updating in post-moving vehicle state includes updating the value of the flag associated with the specific door in response to receiving an indication that the specific door changes its status from a door closed status to a door opened status, in response to opening the specific door. In certain embodiments, analyzing the values of the flags includes confirming whether the value of any of the flags is different than "false" (i.e. "true"). If any value is "true", then at least one specific considered door was opened prior the journey, but the specific door was not opened after the journey. If the value is different than "false", then controller 110 is configured to output an alert of a possible living presence in a vehicle.

According to certain embodiments, the door opening indicators such as counters 111A and 111B in FIG. 1 are reset to their initial value, e.g. each time the car was locked, and controller 110 does not recognize an alert situation (e.g. the same number of doors are opened at pre- and at post-moving states or in a case where the number of doors are different due to opening of a disregarded door, or in cases where the number of doors opened during the post-moving state exceeds the number of doors opened during the pre-moving state. All this occurs in accordance with the predefined logic of the controller 110).

On the other hand, the predefined logic of controller 110 may be configured to alert in cases where the number of doors opened during the pre- and post-moving states are equal, but the hazard of leaving someone unattended in a car has been detected. For example, if, during the pre-moving state, the front and a rear doors of a vehicle were opened, but after the journey only two front doors were opened, the logic of a controller 110 may be configured to alert with respect to this potentially dangerous situation.

According to certain embodiments, the door opening indicators such as counters 111A and 111B in FIG. 1 may be reset to their initial value also e.g. by a user (such as the driver) by using operating switch 122. The reset can be executed at both pre- and post-moving states of the vehicle.

Operating switch 122 can form an existing unit, e.g. a button in the vehicle, or a button in the remote control device of the vehicle or an external button added to the one or both vehicles, or remote control of a vehicle and is operatively coupled to system 100. Alternatively or additionally, operating switch 122 forms a part of a remote control device (not shown) operated by a user typically used for controlling the vehicle's alarm system, unlocking the doors, etc.

Resetting counters 111A and 111B by operating switch 122 can be done, e.g. after a false or true activation of the system 100 has occurred, or when the user identifies that such false activation may occur. An exemplary scenario of outputting a false alert has been described above. After an alert has been output, in certain embodiments, the driver can deactivate the system (described further below) and reset counters 111A and 111B.

Also, in certain embodiments, when the system detects an unattended living presence in a vehicle and, in response, outputs an alert, constituting a true alert, the driver activates the system and resets counters 111A and 111B.

One example of such a scenario is when a user opens a certain door of the car to insert a bag into the vehicle. The user now wishes to reset counters 111A and 111B as he is about to put the children into the vehicle, and does not wish controller 110 to count the opening of the certain door. The user then shuts the baggage, resets counters 111A and 111B, and only then puts the children into the car.

According to certain embodiments, controller 110 is configured to update counters 111A and 111B, for each door being opened in the vehicle, both in the pre-moving vehicle and post-moving vehicle states. Each of the pre-moving vehicle state and post-moving vehicle state are a time slot representing a period of time during which children are being put in or getting out of the vehicle. The time slot of a pre-moving vehicle state starts when the vehicle is stationary, until determining that said vehicle starts moving. The time slot of a post-moving vehicle state starts when the vehicle has stopped moving, until determining that the vehicle is locked, giving rise to a locked vehicle state.

Each time slot is determined by controller 110, based on one or more indications received at controller 110. The indications are used by controller 110 in determining whether the vehicle is stationary and about to start moving, starts moving, has stopped moving and is being locked. Several indications and indicators are described below.

As illustrated in FIG. 1, controller 110 is operatively coupled to several non added-on (i.e. existed in current systems) system components: automotive sensors system 121, operating switch 122, driver's seat pressure sensor 126, transmission sensor 128, vehicle locking sensor 127, alarm system 117, door sensor 114A and door sensor 114B, all of which are indicators.

Each of the indicators is configured to provide an indication regarding start and/or end of a certain time slot and is described in further details below.

Non added-on automotive sensors system 121 is the vehicle's automotive sensors being configured to be switched on and off by a driver, for example by operating the starter switch (not shown) operatively coupled to the motor of the vehicle.

According to certain embodiments, controller 110 is configured to receive an indication from automotive sensors system 121, e.g., through automotive sensor (not shown) coupled to controller 110 that the motor of the vehicle is off or on, and to determine, based on the received indication, the state of the vehicle (whether it is moving or stationary).

In response to opening a door, controller 110 is configured to update the value of counter 111A in response to receiving an indication that any door of the vehicle's doors changes the door status from door closed status to door opened status.

Controller 110 is configured to repeat updating the value of counter 111A in response to receiving an indication that any door of the vehicle's doors changes the door status from door closed status to door opened status, in response to opening said door, until controller 110 receives an indication from automotive sensors system 121 that the vehicle changes its status from stationary to moving. Based on this indication, controller 110 determines that the vehicle has started moving, and hence counting of door openings is ceased. The vehicle now enters a moving vehicle state, indicating that all of the vehicle's doors are closed in response to closing the doors.

Controller 110 is further configured to determine that the vehicle has stopped moving, e.g. by receiving another indication from automotive sensors system 121, that the motor of the vehicle has been turned off again or e.g. by receiving of a combination of at least two indications (motor of the vehicle has been turned off and transmission sensor 128 indicates that the transmission has been turned to parking or neutral state).

In response to receiving the indication, controller 110 is configured to update the value of counter 111B in response to receiving an indication that any door of the vehicle's doors changes its door status from door closed status to door opened status, in response to opening the door, until controller 110 determines that the vehicle is locked, e.g. based on an locking sensor 127 indication, or, for another example, based on indication provided by indication provided by alarm system 117, both further described below, giving rise to a locked vehicle state.

Controller 110 is further configured to receive an indication on start of a time slot from non added-on transmission sensor 128. Transmission sensor 128 is coupled to a transmission and is configured to provide an indication of a change in the transmission in one of its states: a drive state, a reverse state, a parking state, a neutral state etc. A certain transmission state may indicative that the vehicle is in a certain state. For example, a parking state may indicate that the vehicle is either in a pre-moving state or post-moving state. In addition, a change from a first transmission state into another transmission state can also be indicative of entering a certain vehicle state. For example, a change from neutral state or parking state to driving state may be indicative that the vehicle has started moving and is entering a moving state. In an opposite manner, a change from a driving state into a neutral state or parking state may be indicative that the vehicle has stopped moving and is entering a post-moving state.

Controller 110 is also configured to receive an indication on start of a time slot from non added-on operating switch 122 managed by a user.

In some cases, manual activation of system 100 is required. An exemplary scenario where manual activation of controller 110 is required is when the driver approaches a car and notices the high temperature of air in the car being left in the sun for several hours. The driver decides to turn on the air-conditioning or open the windows of the car, prior to putting the children into the car. In order to turn on the air-condition or open the windows, the driver first turns the motor on. In such cases, the driver manually activates controller 110, after turning on motor of the vehicle, to start counting the doors. Hence, according to certain embodiments, controller 110 receives an indication from operating switch 122, based on which controller 110 determines that the vehicle is stationary, giving rise to a pre-moving vehicle state.

Indications on start/end of a time slot can also be received by non added-on driver's seat pressure sensor 126. The latter is typically used for signaling the driver to buckle his seat belt after detecting by pressure sensor 126 that the driver has sat in his seat, turned on the motor and has not yet buckled his seat belt. Detecting that the driver is sitting in his seat can signify that the vehicle starts moving (and hence that the time slot of pre-moving vehicle state has ended). A later indication provided by driver's pressure sensor 126, that the driver is not sitting in his driving seat, can be used by controller 110 to determine that the vehicle has stopped moving, giving rise to the start of a post-moving vehicle state time slot.

Another example of an indication can be provided by non added-on alarm system 117 operatively coupled to system 100. Alarm system 117 is described in detail below. However, with respect to its indicator function, it should be noted that shutting alarm system 117 prior to starting the journey is indicative of the starting of pre-moving vehicle state time slot. Activating alarm system 117 at the end of the journey is indicative of the vehicle being locked, giving rise to a locked vehicle state.

Vehicle locking sensor 127 connected to controller 110 can also be indicative that the vehicle has been locked, giving rise to a locking state.

It should be noted that although the description herein refers to specific examples of indicators, the invention is not bound by these examples. Those skilled in the art would readily appreciate that other non added-on indicators, configured to provide an indication regarding start and/or end of a certain time slot, may also be used.

In accordance with certain embodiments, the indication received from a certain indicator can be considered independently of one or more indications received from other indicators. For example, controller 110 receives an indication of automotive sensors system 121 that the motor of the vehicle is off, and determines that the vehicle is stationary, giving rise to a pre-moving vehicle state. Controller 110 updates the value of counter 111A until an indication received from driver's seat pressure sensor 126 that the driver sits in his seat. Subsequently, controller 110 determines, based on the indication provided by the driver's seat pressure sensor 126, that the vehicle starts moving and ceases updating the value of counter 111A.

Alternatively, in accordance with certain embodiments, controller 110 is configured to determine start and/or end of a time slot based on more than one indications simultaneously or contiguously received from more than one indicator (e.g.

a proper combination of indications received from automotive system sensors 121, transmission sensor 128 and driver's seat pressure sensor 126). Those skilled in the art would readily appreciate that several other indications for determining time slots exist and can also be considered in combination with one or more of the above described indications.

As illustrated in FIG. 1, system 100 is further operatively coupled to at least non added-on two door sensors illustrated in FIG. 1 by 114A and 114B. Each of door sensors 114A and 114B are respectively connected to doors 113A and 113B. Doors 113A and 113B are two of the vehicle's doors. One of the doors, e.g. door 113A, forms the driver's door, allowing the driver to get in and out of the car, whereas the other door, e.g. door 113B, allows an adult to put a child into the car.

In known systems, door sensors 114A and 114B have many usages, all related to their ability to detect that a respective door, connected to a specific door sensor, is open or closed. One of the usages is to alert the driver that one of the doors is opened, and should be closed prior to starting the ride. Once the door is closed, the sensor provides a respective indication. Such an alert is typically output in the dashboard e.g. by displaying a small image of a vehicle with one of the doors opened. On other occasions, the door sensors are used for activating the alarm when it is detected by the main controller of the car or by any alarm system fitted in the car, that a door was opened without disconnecting the alarm. Yet, another example of a usage of door sensors is to open the inside lights in the car, upon opening of a door.

According to certain embodiments, each of non added-on door sensors 114A and 114B are also configured to provide an indication to system 100 and controller 110, that the respective door, 113A or 113B, was opened, i.e. the door changed its status from door close state to door open status. Thus, with reference to door 113B, once sensor 114B senses that door 113B is opened, meaning the door changes its status from door closed state to door open status, it provides an indication, e.g. sends a signal or forwards electrical current, to controller 110 that door 113A is opened. In response, controller 110 updates counter 111A.

As explained above, since the door adjacent to a seat of a driver (driver's door) is being used by the driver (an adult) to get in and out of the car, in certain embodiments, controller 110 is configured to ignore indications received from sensors connected to the driver's door, both in a pre-moving vehicle state and post-moving vehicle state, i.e. ignore indications received from a disregarded door. By the same token controller 110 may also ignore indications received from door sensor(s) connected to the baggage door for the simple reason that a child is not likely to be seated in the baggage compartment.

Some false alerts may be result due to a redundant counting of a door opened for another reason other than putting a child into the car, such as putting an umbrella into the car. In order to decrease the number of such false alerts, in certain embodiments, the time interval that a door was open can be measured before updating counters 111A or 111B. It is assumed that the time interval required for putting a child into the car and buckling the child in the safety seat is longer than the time interval required to insert a bag into the car. Hence, a short interval during which a door was opened can specify that the current instance of opening a door should not be counted and should be ignored.

Measuring the time interval during which a door was opened can be carried out e.g. by timer 125 optionally comprised in controller 110. Timer 125 is configured to receive an indication, e.g. from door sensor 114A, that door 113A changes its door status from door closed status to door opened status, and to measure the time passed until timer 125 receives a second indication from door sensor 114 that door 113A changes its door status from door opened status to door closed status. Controller 110 is then configured to sample timer 125 and receive a measured duration, representing the time interval during which door 113A was opened. After receipt of a measured duration, controller 110 increments counter 111A only if the received measured duration exceeds a predetermined threshold, e.g. 15 seconds. The threshold can be set to have a lower or higher value. For example, if usage of a car seat base is made, which shortens the time required for putting a child into the car, the threshold can be set to be relatively short, e.g. 10 seconds.

Timer 125 is resettable and can be reset, e.g. by controller 110, after a measured time has been sampled from timer 125.

Hence, according to certain embodiments, updating a value of counter 111A in pre-moving vehicle state or post-moving vehicle state includes sampling a timer and receiving a measured duration representative of a time interval during which the door was opened. The value of any counter is updated only if the measured duration exceeds a predetermined threshold.

Although a single timer is illustrated in FIG. 1, those skilled in the art will realize that more than one timer can be used. According to certain embodiments, a different timer can be associated with each door, where each timer measures the time interval during which the associated door was opened.

In certain embodiments, more than one threshold can be defined and be associated with each timer or each door. For example, the threshold for the driver's door time interval, can be set to have a lower value than a door, next to which a child car seat is placed, while assuming that it takes the driver less seconds to get into the car than putting in a child. A similar assumption can be made, for example, when defining a time interval for a door which is regularly being used by older children.

In accordance with certain embodiments, system 100 may be further operatively coupled to one or more power source, such as a vehicle battery or e.g. rechargeable battery 130.

Battery 130 provides electricity to the elements operatively coupled thereto, in particular, to system 100, even prior to turning on the car's switch. By connecting to battery 130, controller 110 is configured to operate and count the number of door openings even when the motor of the vehicle is off in a pre-moving vehicle state or post-moving vehicle state.

As also illustrated in FIG. 1, system 100 is further operatively coupled to non added-on alarm system 117, hazard system 118 and/or emergency system 123, some or all of which are typically integrated in vehicles. These systems are generally referred to as alert systems.

Known alarm systems may output certain types of alerts such as generating a high-volume sound (a siren, klaxon, pre-recorded verbal warning, the vehicle's own horn, or a combination thereof), flashing some of the vehicle's lights, or notifying the car's owner via a paging/cellular system. Some alarm systems also interrupt various electrical circuits necessary for the car to start.

Known hazard systems usually flash emergency vehicle lights. Such emergency lights usually flash left and right directional signals, front and rear, all at the same time, and in phases. However, there are other types of alerts output by hazard systems, such as emitting visual warning lights fitted to a vehicle and designated to convey a hazard situation, such as a beacon, a light bar, a wig-wag, hide-away light and such.

Although the above discussion focused on alarm and hazard systems, those skilled in the art would readily appreciate that other systems currently fitted in vehicles may be of interest and relevance. Such systems are configured to provide other types of alerts. For example, an emergency system which unlocks the vehicles' doors in case of emergency, is one example. In certain embodiments, unlocking of the doors enables a passerby to open the doors of the vehicle and assist any passengers inside the vehicle.

According to certain embodiments, controller 110 is configured to output an alert if the number of door openings while the vehicle is in pre-moving vehicle state exceeds the number of door openings while the vehicle is in post-moving vehicle state.

In certain cases, in order to output an alert, controller 110 triggers at least one of alarm system 117, hazard system 118 and emergency system 123. In response, the triggered system outputs at least one type of alert, such as those detailed above, including but not limited to emitting sound, flashing lights, notifying the owner of the car, or unlocking the doors.

According to some embodiments, after one or more of the specified alerts have been triggered by system 100, system 100 should be deactivated in order to shut down the triggered alert. Deactivation of one or more of the triggered systems can be executed.

In some cases, the alert can be a true alert triggered after system 100 has detected a living presence in a vehicle. The driver, or any other entity, takes care of the unattended child and then turns to deactivating the alert. In other cases, the alert can be a false alert, i.e., system 100 erroneously detects an emergency situation. In such cases, the driver wishes to deactivate the system 100. Optionally, after deactivating system 100, the driver resets the initial value of either or both counters 111A and 111B to their initial value and/or timer 125.

Deactivation of system 100, i.e., shutting down one or more kinds of alerts, can be carried out, e.g. by deactivation unit 124 illustrated in FIG. 1.

Deactivation unit 124 can form an existing unit, e.g. a button in the vehicle, or an external button added to the vehicle, and is operatively coupled to system 100 for deactivating system 100. Alternatively or additionally, deactivation unit 124 can form an integral part of a remote control device operated by a user, associated with the car.

Deactivation can also be done by a predefined sequence of operations of existing buttons of the car, or of the remote control (e.g. by simultaneously pressing two existing remote control buttons).

Alternatively or additionally, deactivation can also be executed by closing a vehicle door/doors that were opened as a part of an alert sequence.

Alternatively or additionally, executing of a deactivation can be coupled with the resetting of an indication unit 120.

Those skilled in the art would readily appreciate that deactivation unit 124 and operating switch 122 can form a single unit configured for operating the actions detailed with respect to deactivation unit 124 and operating switch 122. Alternatively, or additionally, deactivation unit 124 and operating switch 122 can be separate units.

In certain embodiments, the user of a car wishes to permanently deactivate system 100, for example, since the user does have not children being transported in the car, and has no use for system 100. Hence, the user permanently deactivates system 100 by providing a suitable instruction to system 100 e.g., while using one or more of deactivation unit 124 or operating switch 122.

Turning now to FIG. 2, FIG. 2 is a flow diagram showing an example of a sequence of operations performed during the detection process, in accordance with certain embodiments. For clarity purposes, the description of the operations in FIG. 2 is provided with reference to respective elements illustrated in FIG. 1. However, this is done by way of example only, and the operations in FIG. 2 should not be construed to be limited by the specific configuration which is exemplified in FIG. 1.

FIG. 2 illustrates an example in which pre-moving vehicle state and post-moving vehicle state start and end upon receiving an indication that motor of the vehicle is off or on.

As illustrated at block 201, a vehicle, such as a car, is stationary, giving rise to a pre-moving vehicle state. Controller 110 illustrated in FIG. 1 is configured to determine that the vehicle is stationary, for example by receiving an indication from automotive sensors system 121, that the motor of the vehicle is off and the transmission of the vehicle is in the parking state, and/or by receiving an indication that transmission is in parking or neutral position.

At block 202 one or more doors are opened, in response to which, at block 202A controller 110 is configured to update a value of a door opening indicator, e.g. counter 111A, for each door being opened (in response to receiving an indication that a door changes its status from door closed status to door opened status).

Block 202A and progressive block 208A referred to below, illustrate specific examples where counters 111A and 111B are unified, i.e. form a single counter 111A, which is updated to a pre-moving vehicle state by incrementing its value, and in a post-vehicle state by the reverse operation of decrementing its value.

Furthermore, block 202A illustrates an example where usage of one or more timers, e.g. timer 125 illustrated in FIG. 1, are used. As illustrated in block 202A, the value of the single counter is incremented in response to receiving an indication that any door changes its status from door closed status to door opened status, in response to opening. Incrementing the value is executed only after sampling a timer and receiving a measured duration representative of a time interval during which the door was opened. If the measured duration exceeds a predetermined threshold, then incrementing the value of the counter is executed.

At block 203, the driver's door is opened, in response to which updating the single counter is executed. Alternatively, the driver's door may be ignored.

With reference to FIG. 1, according to certain embodiments, the indications of door changing its status, as received at blocks 202 and 203, can be provided by door sensors 114A and 114B.

Updating (incrementing) the value of the counter continues until determining that the vehicle has started moving, by receiving an indication from automotive sensors system 121 that the motor of the vehicle is turned on and the state of a transmission of the vehicle has been changed to a drive state, as illustrated at block 204.

Blocks 205, 206 and 207 illustrate that after the pre-moving vehicle state and before entering post-moving vehicle state, some doors may be opened and the car may be stationary. Thus, for example, a door may be opened, prior to the journey or after the journey, for example, by older children and/or other adults, when getting into or out of the car. Additionally, the car may stop during the ride, for example, due to traffic lights, etc. However, these actions (entering a stationary state or doors opening) are disregarded for the purpose of counting the doors prior to and after the journey, e.g. after receiving an indication that transmission is in drive or reverse position.

The moving vehicle state is indicative that all doors of the at least two doors changed the door status from said door opened status to said door closed status, in response to closing said doors.

Block 208 illustrates determining that the car has stopped moving, giving rise to a post-moving vehicle state. An indication that the car has stopped moving can be received for example, by automotive sensors system 121, e.g., that the motor is turned off, and/or by receiving an indication that transmission is in parking or neutral position.

In response to receiving an indication that any door of the vehicle's doors has changed its status from door closed status to door opened status in block 208, block 208A illustrates decrementing the value of the counter in response to receiving an indication that any door has changed its status from door closed status to door opened status, in response to opening the door.

Once determining that the car is locked, at block 209, analysis of the value of the counter is executed. If the value of the counter is positive, i.e., the number of door openings while the car is in pre-moving vehicle state exceeds the number of door openings while the car is in post-moving vehicle state, then the process moves to block 210 for outputting an alert. Otherwise, process moves to block 211.

Outputting an alert can be e.g. by triggering one or more of emergency system 123, hazard system 118 and alarm system 117 illustrated in FIG. 1.

Optionally, after analyzing the value of the counter, irrespective of the outcome, resetting the value of the counter is executed at block 211.

It should be noted that the invention is not bound by the sequence of operations performed during detection operation, nor by the functionalities and structure of each of the various units referred to in FIG. 1. Moreover, the various embodiments illustrated in FIG. 1 are also applied to FIG. 2.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A computer-implemented method for detecting an unattended living presence in a vehicle having at least two doors, comprising:
   (i) determining that said vehicle is stationary, giving rise to a pre-moving vehicle state;
   (ii) providing with respect to each door of said at least two doors, a door closed status indicative that the door is closed, or a door opened status indicative that said door is opened;
   (iii) updating a value of at least one first door opening indicator in response to receiving an indication that any door of said at least two doors changes the door status from said door closed status to said door opened status, in response to opening said door;
   (iv) repeating said stage (iii), until determining that said vehicle starts moving giving rise to a moving vehicle state; said updated value of the at least one first door opening indicator obtained in (iii) being indicative of a number of doors opened while the vehicle is in said pre-moving vehicle state; wherein said moving vehicle state is indicative that all doors of said at least two doors changed the door status from said door opened status to said door closed status, in response to closing said doors;
   (v) determining that said vehicle stopped moving giving rise to a post-moving vehicle state;
   (vi) updating a value of at least one second door opening indicator in response to receiving an indication that any door of said at least two doors changes the door status from said door closed status to said door opened status, in response to opening said door;
   (vii) repeating stage (vi), until determining that said vehicle is locked, giving rise to a locked vehicle state; said updated value of the at least one second door opening indicator obtained in (vi) being indicative of a number of doors opened while the vehicle is in said post-moving vehicle state;
   (viii) analyzing the values of said at least one first door opening indicator and at least one second door opening indicator to determine if said number of doors opened while the vehicle is in pre-moving vehicle stage exceeds said number of doors opened while the vehicle is in post-moving vehicle stage, and, if in the affirmative, outputting an alert of a possible living presence in a vehicle,
   wherein at least one of said at least one first and second door opening indicators is a counter configured to count a total number of opened doors; and
   wherein said updated values in said stages (iii) and (vi) are indicative of a total number of doors opened while the vehicle is in said pre-moving vehicle state and a total number of doors opened while the vehicle is in said post-moving vehicle state, respectively.

2. The computer-implemented method of claim 1, wherein at least one of said at least two doors is a door determined to be ignored constituting a disregarded door, and wherein said updating in said stages (iii) and (vi) occurs in response to indications received from at least one door of said at least two doors, not constituting said disregarded door.

3. The computer-implemented method of claim 2, wherein said disregarded door is a door adjacent to a seat of a driver.

4. The computer-implemented method of claim 2, wherein said disregarded door is a baggage door.

5. The computer-implemented method of claim 1, wherein said first and second door opening indicators being a single common door opening indicator, and wherein said updating in said stage (iii) constitutes incrementing the value of said single common door opening indicators by a value N and wherein said reversed updating in said stage (vi) being reversed to the updating in said step (iii) and constitutes decrementing the value of said single common door opening indicators by said value N.

6. The computer-implemented method of claim 5, wherein said N is different for all doors.

7. The computer-implemented method of claim 5, wherein said N is identical for all repeated steps (iii) and (vi).

8. The computer-implemented method of claim 1, wherein said vehicle comprises at least two non added-on door sensors, each of said non added-on door sensors is associated with a respective door of said at least two doors, and wherein each of said non added-on door sensors is configured to provide an indication that any door of said at least two doors changes the door status from said door closed status to said door opened status, in response to opening said door.

9. The computer-implemented method of claim 8, wherein said receiving indication in said stages (iii), and (vi) is based on at least one indication provided by at least one said non added-on door sensor.

10. The computer-implemented method of claim 1, wherein at least one of said determining in said stages (i), (iv) and (v) and (vii) is based on at least one indication provided by at least one non added-on indicator integrated in said vehicle.

11. The computer-implemented method of claim 10, wherein said at least one non added-on indicator is selected from a group comprising: an automotive sensors system, transmission sensor, an operating switch, a driver's seat pressure sensor, an alarm system, a vehicle locking sensor and a door sensor.

12. The computer-implemented method of claim 10, wherein said indicator is an automotive sensors system, and wherein:
said determining in said stages (i) and (v) is based on receiving an indication from said automotive sensors system that a motor of the vehicle is off; and
said determining in said stage (iv) is based on receiving an indication from said automotive sensors system that said motor is turned on.

13. The computer-implemented method of claim 1, wherein updating in said stage (iii) further comprises:
in response to receiving an indication that any door of said at least two doors changes the door status from said door closed status to said door opened status, sampling a timer and receiving a measured duration representative of a time interval during which said door was opened, and
updating a value of at least a first counter, only if said measured duration exceeds a predetermined threshold.

14. The computer-implemented method of claim 1, wherein updating in said stage (vi) further comprises:
in response to receiving an indication that any door of said at least two doors changes the door status from said door closed status to said door opened status, sampling a timer and receiving a measured duration representative of a time interval during which said door was opened, and
updating a value of at least a second counter, only if said measured duration exceeds a predetermined threshold.

15. The computer-implemented method of claim 1, wherein said vehicle comprises one or more of an alarm system, a hazard system and emergency system, and wherein said outputting an alert in stage (viii) comprises triggering at least one of said alarm system, hazard system and emergency system, wherein said one or more triggered systems are configured to output at least one type of alert.

16. The computer-implemented method of claim 15, further comprising:
(ix) deactivating said one or more triggered systems.

17. A system of detecting an unattended living presence in a vehicle, the vehicle having at least two doors, the system comprising:
an automotive sensors system coupled to a motor for indicating whether said motor is switched on or off;
a transmission sensor coupled to a transmission for indicating whether said transmission is in one of the following states: a drive state, a reverse state, a parking state or a neutral state;
at least two door sensors, each of said at least two door sensors coupled to a respective door of said at least two doors and is configured to provide with respect to each door of said at least two doors a door closed status indicative that the door is closed or a door opened status indicative that said door is opened;
an alert system configured to output an alert in response to triggering said alert system; and
a controller operatively coupled to said at least two door sensors, to said automotive sensors system, to a said transmission sensor and to said alarm system, said controller comprising at least one door opening indicator;
wherein said controller is configured to:
(i) determine that a motor coupled to said automotive sensors system is off, giving rise to a pre-moving vehicle stage;
(ii) update a value of at least one first door opening indicator in response to receiving an indication from any door sensor of said door sensors that a corresponding door of said at least two doors changes the door status from said door closed status to said door opened status, in response to opening said door;
(iii) repeat stage (ii), until determining that said motor is turned on and said transmission has turned to a drive state; said updated value of the at least one first door opening indicator obtained in (ii) being indicative of a number of doors opened while the vehicle is in said pre-moving vehicle state; wherein said moving vehicle state is indicative that all doors of said at least two doors changed the door status from said door opened status to said door closed status, in response to closing said doors;
(iv) determine that said motor was turned off giving rise to a post-moving vehicle stage;
(v) update a value of at least one second door opening indicator in response to receiving an indication that any door of said at least two doors changes the door status from said door closed status to said door opened status, in response to opening said door;
(vi) repeat stage (v), until determining that said vehicle is locked giving rise to a locked vehicle state; said updated value of the at least one second door opening indicator obtained in (v) being indicative of a number of doors opened while the vehicle is in said post-moving vehicle state;

(vii) analyze the values of said at least one first door opening indicator and at least one second door opening indicator to determine if said number of doors opened while the vehicle is in pre-moving vehicle stage exceeds said number of doors opened while the vehicle is in post-moving vehicle stage, and, if in the affirmative, outputting an alert of a possible unattended living presence in a vehicle, wherein at least one of said at least one first and second door opening indicators is a counter configured to count a total number of opened doors; and wherein said updated values in said stages (iii) and (vi) are indicative of a total number of doors opened while the vehicle is in said pre-moving vehicle state and a total number of doors opened while the vehicle is in said post-moving vehicle state, respectively.

18. The system of claim 17, wherein said alert system is comprised of at least one of alarm system, hazard system and emergency system, and wherein outputting an alert comprises outputting at least one type of alert.

19. A computer-implemented program storage device readable by machine, tangibly embodying a program of instructions executable by the machine to perform a method for detecting an unattended living presence in a vehicle having at least two doors, comprising:

(i) determining that said vehicle is stationary, giving rise to a pre-moving vehicle state;

(ii) providing with respect to each door of said at least two doors, a door closed status indicative that the door is closed or a door opened status indicative that said door is opened;

(iii) updating a value of at least one first door opened indicator in response to receiving an indication that any door of said at least two doors changes the door status from said door closed status to said door opened status, in response to opening said door;

(iv) repeating said stage (iii), until determining that said vehicle starts moving giving rise to a moving vehicle state; said updated value of the at least one first door opening indicator obtained in (iii) is indicative of a number of doors opened while the vehicle is in said pre-moving vehicle state; wherein said moving vehicle state is indicative that all doors of said at least two doors changed the door status from said door opened status to said door closed status, in response to closing said doors;

(v) determining that said vehicle stopped moving, giving rise to a post-moving vehicle state;

(vi) updating a value of at least one opening of a second door indicator in response to receiving an indication that any door of said at least two doors changes the door status from said door closed status to said door opened status, in response to opening said door;

(vii) repeating stage (vi), until determining that said vehicle is locked, giving rise to a locked vehicle state; said updated value of the at least one second door opening indicator obtained in (vi) being indicative of a number of doors opened while the vehicle is in said post-moving vehicle state;

(viii) analyzing the values of said at least one first door opening indicator and at least one second door opening indicator to determine if said number of doors opened while the vehicle is in pre-moving vehicle stage exceeds said number of doors opened while the vehicle is in post-moving vehicle stage, and, if in the affirmative, outputting an alert of a possible unattended living presence in a vehicle, wherein at least one of said at least one first and second door opening indicators is a counter configured to count a total number of opened doors; and wherein said updated values in said stages (iii) and (vi) are indicative of a total number of doors opened while the vehicle is in said pre-moving vehicle state and a total number of doors opened while the vehicle is in said post-moving vehicle state, respectively.

* * * * *